United States Patent
Liao et al.

(10) Patent No.: US 11,027,259 B2
(45) Date of Patent: Jun. 8, 2021

(54) PREPARATION METHOD FOR HOLLOW MOLYBDATE COMPOSITE MICROSPHERES AND METHOD FOR CATALYZING AMMONIA BORANE HYDROLYSIS TO PRODUCE HYDROGEN

(71) Applicant: Huizhou University, Huizhou (CN)

(72) Inventors: Jinyun Liao, Huizhou (CN); Dongsheng Lu, Huizhou (CN); Hao Li, Huizhou (CN); Dingshu Xiao, Huizhou (CN)

(73) Assignee: HUIZHOU UNIVERSITY, Huizhou (CN)

(*) Notice: Subject to any disclaimer, the term of this patent is extended or adjusted under 35 U.S.C. 154(b) by 0 days.

(21) Appl. No.: 16/747,048

(22) Filed: Jan. 20, 2020

(65) Prior Publication Data

US 2020/0147591 A1    May 14, 2020

Related U.S. Application Data

(63) Continuation of application No. PCT/CN2018/117564, filed on Nov. 27, 2018.

(30) Foreign Application Priority Data

Dec. 5, 2017  (CN) .......................... 201711266864.8

(51) Int. Cl.
| | | |
|---|---|---|
| *B01J 23/00* | (2006.01) | |
| *B01J 23/885* | (2006.01) | |
| *B01J 35/08* | (2006.01) | |
| *B01J 37/00* | (2006.01) | |
| *B01J 37/04* | (2006.01) | |
| *B01J 37/06* | (2006.01) | |
| *B01J 37/08* | (2006.01) | |
| *C01B 3/06* | (2006.01) | |
| *C01G 39/00* | (2006.01) | |
| *C01G 53/00* | (2006.01) | |

(52) U.S. Cl.
CPC ............ *B01J 23/885* (2013.01); *B01J 35/08* (2013.01); *B01J 37/009* (2013.01); *B01J 37/04* (2013.01); *B01J 37/06* (2013.01); *B01J 37/08* (2013.01); *C01B 3/06* (2013.01); *C01G 39/006* (2013.01); *C01G 53/40* (2013.01); *C01P 2002/72* (2013.01); *C01P 2004/03* (2013.01); *C01P 2004/04* (2013.01); *C01P 2004/34* (2013.01); *C01P 2006/12* (2013.01)

(58) Field of Classification Search
CPC ...... B01J 23/882; B01J 23/883; B01J 23/885; C01G 39/006; C01G 39/02; C01G 51/40; C01G 51/04; C01B 3/061; C01B 3/063; C01B 3/065; C01B 3/04
See application file for complete search history.

(56) References Cited

U.S. PATENT DOCUMENTS

2010/0047159 A1 * 2/2010 Varma ...................... C01B 3/04
                                                                 423/648.1

FOREIGN PATENT DOCUMENTS

| CN | 104258847 A | * | 1/2015 |
|---|---|---|---|
| CN | 107970944 A |  | 5/2018 |
| CN | 108057446 A | * | 5/2018 |
| CN | 107970944 B |  | 10/2019 |

OTHER PUBLICATIONS

Translation of Liu et al., "Hydrothermal synthesis of Ni—Mo unsupported catalyst . . . " Petroleum Processing and Petrochemicals, vol. 44, No. 9, Sep. 2013. (Year: 2013).*
SIPO, International Search Report, PCT Patent Application No. PCT/CN2018/117564, Pub. No. WO2019109830.
Search Report and Notification of First Office Action of CN201510138497.8.
Liu, Huan et al., Hydrothermal Synthesis of Ni—Mo Unsupported Catalyst and their Catalytic Performance, Petroleum Processing and Petrochemicals, vol. 44, No. 9, Sep. 30, 2013, ISSN: 1005-2399, pp. 19-21.

* cited by examiner

*Primary Examiner* — Steven J Bos
(74) *Attorney, Agent, or Firm* — Hemisphere Law, PLLC; Zhigang Ma

(57) ABSTRACT

A method of preparing hollow molybdate composite microspheres includes steps of: (1) dissolving 1-4 mmol of $MCl_2$ in 20 ml of water to obtain a solution A and dissolving 1-4 mmol. of molybdic acid in 20 ml of water to obtain a solution B, followed by mixing the solution A and the solution B, in which M is Co, Ni, or Cu; (2) dissolving 10-40 mmol of urea in 40 ml of water, adding the mixed solution of step (1) and stirring uniformly; (3) placing the mixed solution of step (2) into a reaction vessel and reacting at 120-160° C. for 6-12 hours; (4) suction filtrating and water washing, followed by drying in a vacuum oven at 40-60° C.; (5) calcination at 350-500° C. for 2-4 hours in a Muffle furnace.

9 Claims, 3 Drawing Sheets

PREPARATION METHOD FOR HOLLOW MOLYBDATE COMPOSITE MICROSPHERES AND METHOD FOR CATALYZING AMMONIA BORANE HYDROLYSIS TO PRODUCE HYDROGEN

CROSS-REFERENCE TO RELATED APPLICATIONS

The present application is a continuation of PCT application No. PCT/CN2018/117564, filed on Nov. 27, 2018, which designates United States and claims priority of China Patent Application No. 201711266864.8, filed on Dec. 12, 2017 which is incorporated herein by reference.

BACKGROUND OF THE INVENTION

1. Technical Field

The invention relates to the technical field of composite preparation, in particular to a method for preparing hollow molybdate composite microspheres and application thereof as a catalyst for ammonia borane hydrolysis to produce hydrogen.

2. Description of Related Art

A molybdate is composed of one or more cations and $(MoO_4)^{2-}$ with different properties, for example, lanthanum molybdate and europium molybdate can be fluorescent powder materials; the cobalt, nickel and copper molybdate can act as catalysts with excellent catalytic performance. The molybdates with different compositions can also be widely applied in the fields of optics, electricity, catalysis and medical treatment, so the molybdate is an important member of inorganic functional materials.

In recent years, the preparation method for molybdate nanomaterials has been a research hotspot. It needs higher temperature and cannot guarantee the crystal with better morphology in the traditional high-temperature solid-state method. Therefore, some low-temperature synthesis methods, such as hydrothermal synthesis, template method, microemulsion method and precipitation method, have emerged. Hollow $CdMoO_4$ microspheres have been synthesized by precipitation in aqueous solution at room temperature (L. Zhen et al. High photocatalytic activity and photoluminescence property of hollow $CdMoO_4$ microspheres. Scripta Materials, 2008, 58, 461-464). Although the soluble inorganic salt NaCl added in the reaction process does not participate in the reaction, the precipitation speed of $CdMoO_4$ is influenced when NaCl is served as an addition agent; however, according to the preparation method, the suspension liquid is required to stand for 5 days, the period is long, and industrial production is not facilitated. $CoMoO_4$ nanorods are synthesized by a solvothermal synthesis method, a precursor is prepared by using a mixed solution of ultrapure water, ethanol and ethylene glycol as a solvent in a reaction process, and the $CoMoO_4$ nanorods are obtained by calcining under an argon atmosphere (Liangjun Wang et al. Synthesis of porous $CoMoO_4$ nanorods as a bifunctional catalyst for a Li—$O_2$ battery and superior anode for a Li-ion battery, Nanoscale, 2017, 9, 3898-3904). The established method is relatively simple, but it uses organic solvent and rare gas, higher costs. $CoMoO_4$ nanoplatelets are synthesized by a two-step hydrothermal method using graphene as a template, and argon as a protective gas in the calcination stage, still making the preparation cost very high (Xiaoqin Yan et al. 3D architecture of a graphene/$CoMoO_4$ composite for asymmetric supercapacitors usable at variable temperatures. J. Colloid Interface Sci., 2017, 493, 42-50). The morphology of the synthesized products of cobalt molybdate and copper molybdate mostly are nanoplatelets or nanoparticles, and hollow microspheres are not reported. The hollow spheres have high effective contact area and porosity, which is a promotion for the activity of catalysts.

BRIEF SUMMARY OF THE INVENTION

The present invention aims to solve the key problems of high preparation cost, uncontrollable morphology and the like in the preparation process. The present invention provides a method for preparing multi-molybdate hollow microspheres, in which a multi-molybdate hollow microsphere structure is successfully synthesized by using urea as a precipitant and a hydrothermal synthesis method; the synthesis method provides technical support for systematically studying the structure-activity relationship between the microstructure and the performance of the multi-molybdate nanomaterial, and also provides an important step for promoting low-cost and large-scale production of the material.

In order to solve the above technical problems, the technical solution adopted by the invention is as follows: a method for preparing hollow molybdate composite microspheres includes steps of:

(1) dissolving 1-4 mmol of $MCl_2$ in 20 ml of water to obtain a solution A, and dissolving 1-4 mmol of molybdic acid in 20 ml of water to obtain a solution B, followed by mixing the solution A and the solution B to obtain a mixed solution C, wherein M is at least one of Co, Ni, or Cu;

(2) dissolving 10-40 mmol of urea in 40 ml of water, adding the mixed solution of step (1) and stirring uniformly to obtain a solution D;

(3) transferring the mixed solution of step (2) into a reaction vessel and reacting at 120-160° C. for 6-12 hours to obtain product E;

(4) carrying out suction filtration and water washing to the product E, followed by drying in a vacuum oven at 40-60° C.; and (5) calcining the solid at 350-500° C. for 2~4 hours in a muffle furnace to obtain hollow molybdate composite microspheres.

Preferably, the ratio of the total mass of soluble $MCl_2$ to the mass of molybdic acid in the step (1) is 1:1.

Preferably, in the step (2), the stirring time is 0.5-1 hour.

Preferably, in the step (3), the temperature in the vacuum oven is 40-60° C.

In summary, the technical solution of the invention has the following beneficial effects. 1) The unique nano hollow sphere prepared by the invention has higher effective contact area and porosity; 2) the process is simple, and the raw materials are cheap and easy to obtain; and 3) the preparation process does not require a surfactant as a structure-directing agent for morphology control.

Due to the characteristics of microstructure, the synthesized multi-molybdate hollow microspheres are expected to be highly active catalysts, for example, exhibiting superior catalytic activity for ammonia borane hydrolysis to produce hydrogen.

BRIEF DESCRIPTION OF THE SEVERAL VIEWS OF THE DRAWINGS

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

Figure 1:
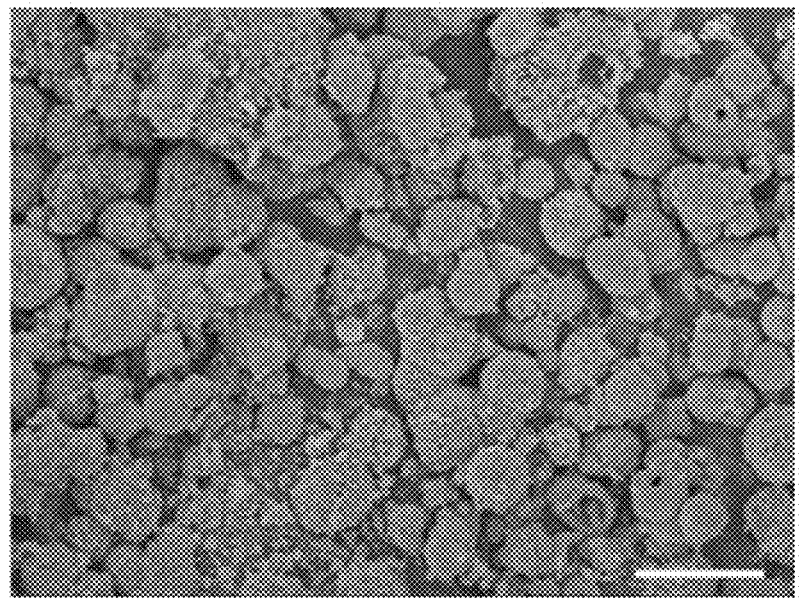
FIG. 1 is an SEM image of $Co_{0.8}Cu_{0.2}MoO_4$ prepared according to the present invention.
Figure 2:
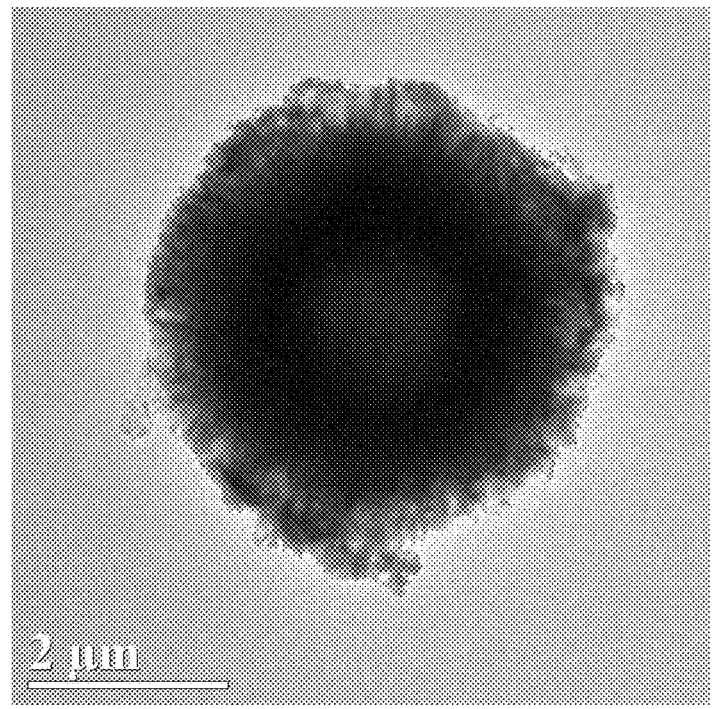
FIG. 2 is a TEM image of $Co_{0.8}Cu_{0.2}MoO_4$ prepared according to the present invention.

The invention will now be described in detail through several embodiments with reference to the accompanying drawings.

First Embodiment 1. 1 mmol $CuCl_2$ was dissolved in 20 mL water to obtain a solution A; 1 mmol molybdic acid was then dissolved in 20 mL water to obtain a solution B; and then the solution A and the solution B were mixed to obtain a mixed solution C.

2. 10 mmol urea was dissolved in 40 mL water, and the solution C above was added; the obtained solution was stirred for 30 min, then transferred to a reaction vessel and reacted at 160° C. for 8 hours, carried out with suction filtration and washing, and dried in a vacuum oven at 40° C., and calcined in a muffle furnace at 500° C. for 2 hours; the sample composition was $CuMoO_4$.

Second Embodiment 1. x mmol $CuCl_2$, y mmol $NiCl_2$ and (1-x-y) mmol $CoCl_2$ were dissolved in 20 mL water to obtain a solution A; 2 mmol molybdic acid was then dissolved in 20 mL water to obtain a solution B; and the two solutions were mixed to obtain a mixed solution C.

2. 20 mmol urea was dissolved in 40 mL water, and the solution C above was added; the obtained solution was stirred for 30 min, then transferred to a reaction vessel and reacted at 120° C. for 12 hours, carried out with suction filtration and washing, and dried in a vacuum oven at 60° C., and calcined in a muffle furnace at 500° C. for 2 hours; the sample composition was $Cu_xCo_yNi_{1-x-y}MoO_4$.

Third Embodiment 1. x mmol $CuCl_2$, y mmol $NiCl_2$ and (1-x-y) mmol $CoCl_2$ were dissolved in 20 mL water to obtain a solution A; 2 mmol molybdic acid was then dissolved in 20 mL water to obtain a solution B; and the two solutions were mixed to obtain a mixed solution C.

2. 30 mmol urea was dissolved in 40 mL water, and the solution C above was added; the obtained solution was stirred for 30 min, then transferred to a reaction vessel and reacted at 160° C. for 8 hours, carried out with suction filtration and washing, and dried in a vacuum oven at 40° C., and calcined in a muffle furnace at 350° C. for 2 hours; the sample composition was $Cu_xCo_yNi_{1-x-y}MoO_4$.

Fourth Embodiment 1. x mmol $CuCl_2$, y mmol $NiCl_2$ and (1-x-y) mmol $CoCl_2$ were dissolved in 20 mL water to obtain a solution A; 2 mmol molybdic acid was then dissolved in 20 mL water to obtain a solution B; and the two solutions were mixed to obtain a mixed solution C.

2. 40 mmol urea was dissolved in 40 mL water, and the solution C above was added; the obtained solution was stirred for 30 min, then transferred to a reaction vessel and reacted at 160° C. for 12 hours, carried out with suction filtration and washing, and dried in a vacuum oven at 40° C., and calcined in a muffle furnace at 500° C. for 4 hours; the sample composition was $Cu_xCo_yNi_{1-x-y}MoO_4$.

Fifth Embodiment 1. x mmol $CuCl_2$, y mmol $NiCl_2$ and (1-x-y) mmol $CoCl_2$ were dissolved in 20 mL water to obtain a solution A; 4 mmol molybdic acid was then dissolved in 20 mL water to obtain a solution B; and the two solutions were mixed to obtain a mixed solution C.

2. 40 mmol urea was dissolved in 40 mL water, and the solution C above was added; the obtained solution was stirred for 1 hour, then transferred to a reaction vessel and reacted at 160° C. for 12 h, carried out with suction filtration and washing, and dried in a vacuum oven at 60° C., and calcined in a muffle furnace at 500° C. for 4 hour; the sample composition was $Cu_xCo_yNi_{1-x-y}MoO_4$.

1. SEM Analysis

FIG. 1 is an SEM image of $Co_{0.8}Cu_{0.2}MoO_4$ prepared according to the present invention. As can be seen from the scan diagram, the morphology of $Co_{0.8}Cu_{0.2}MoO_4$ obtained by hydrothermal synthesis is nanowires with a diameter of about 0.5-0.8 μm.

2. TEM Test

For the TEM images of $Co_{0.8}Cu_{0.2}MoO_4$ prepared according to the present invention, the catalyst performance of the hollow microspheres can be further confirmed from the projection view.

3. BET Test

Figure 3:
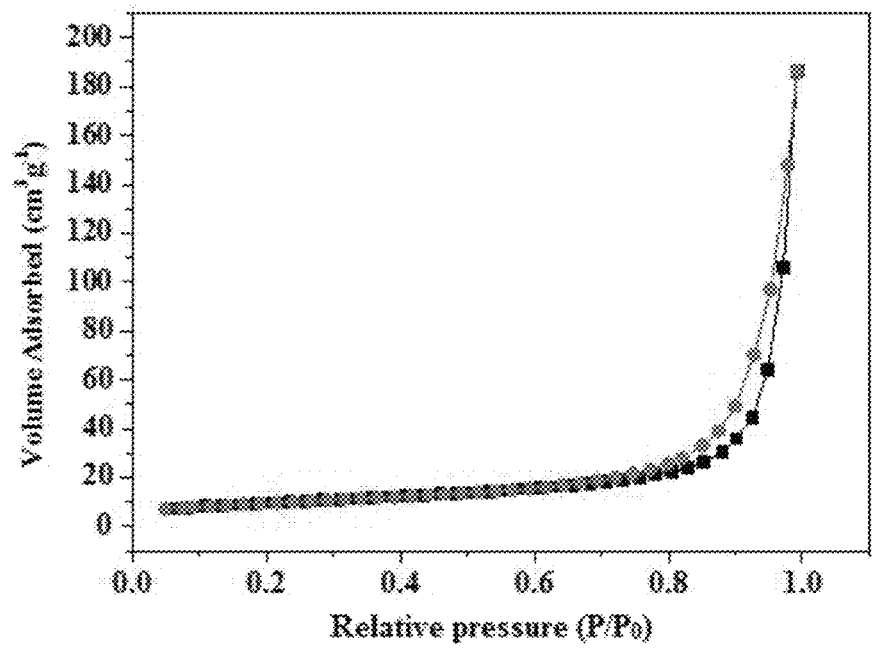
FIG. 3 is a BET test curve of $Co_{0.8}Cu_{0.2}MoO_4$ prepared according to the present invention.

FIG. 3 is a nitrogen adsorption and desorption isotherm curve of $Co_{0.8}Cu_{0.2}MoO_4$ prepared according to the present invention, having a specific surface area of 30.01 m²/g.

4. XRD

Figure 4:
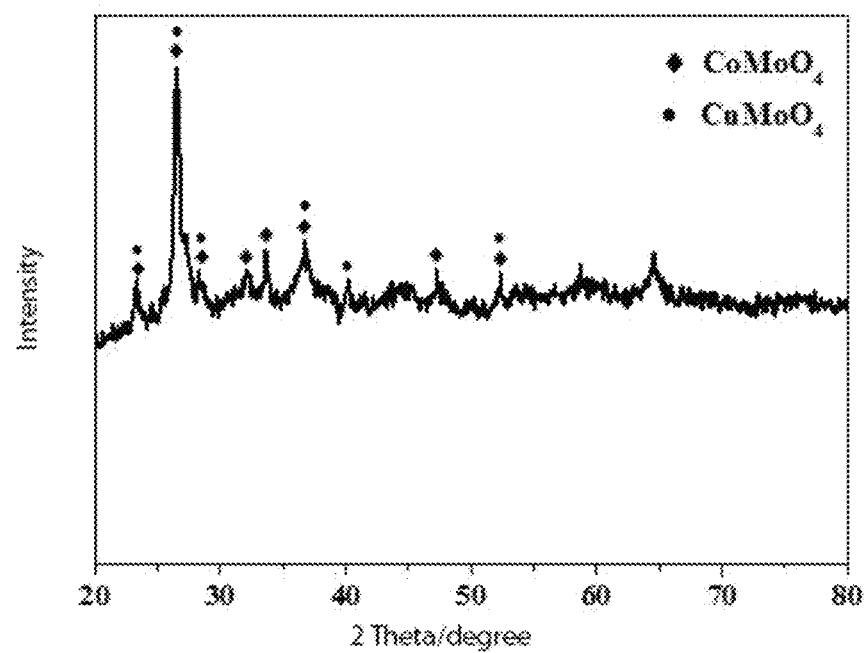
FIG. 4 is an XRD test curve of $Co_{0.8}Cu_{0.2}MoO_4$ prepared according to the present invention.

FIG. 4 is an XRD test of $Co_{0.8}Cu_{0.2}MoO_4$ prepared according to the present invention; the characteristic peaks of corresponding crystal planes of $CuMoO_4$ and $CoMoO_4$ are marked in the figure.

5. Test of Catalytic Performance for Hydrogen Production

Figure 5:
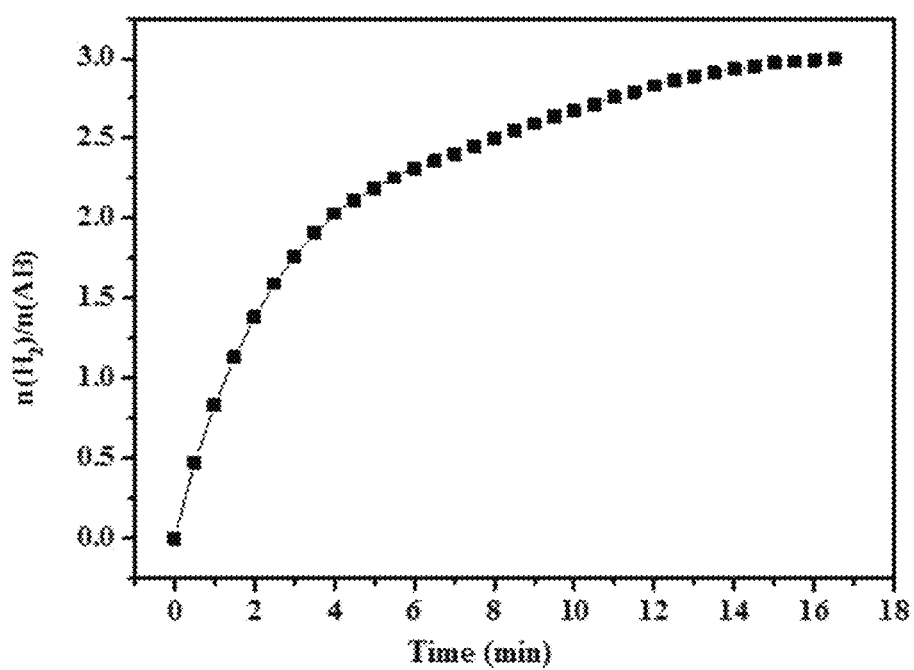
FIG. 5 is a catalytic hydrogen production test curve of $Co_{0.8}Cu_{0.2}MoO_4$ prepared according to the present invention.

FIG. 5 is a performance test of $Co_{0.8}Cu_{0.2}MoO_4$ prepared according to the present invention as a catalyst for ammonia borane hydrolysis to produce hydrogen, the amount of $NH_3BH_3$ is 3 mmol, NaOH is 20 mmol, and the catalyst is 10 mg. The test showed that that it produced 56 mL hydrogen per minute by taking $Co_{0.8}Cu_{0.2}MoO_4$ as a catalyst at 25° C.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A method for preparing hollow molybdate composite microspheres, comprising steps of:
    (1) dissolving 1-4 mmol of $MCl_2$ in 20 ml of water to obtain a solution A, and dissolving 1-4 mmol of molybdic acid in 20 ml of water to obtain a solution B, followed by mixing the solution A and the solution B to obtain a mixed solution C, in which M being at least one of Co, Ni, or Cu;

(2) dissolving 10-40 mmol of urea in 40 ml of water, adding the mixed solution C of step (1) and stirring uniformly to obtain a solution D;

(3) transferring the mixed solution D of step (2) into a reaction vessel and reacting at 120-160° C. for 6-12 hours to obtain product E;

(4) carrying out suction filtration and water washing to the product E, followed by drying in a vacuum oven at 40-60° C. to obtain a solid; and (5) calcining the solid at 350-500° C. for 2 to 4 hours in a muffle furnace to obtain hollow molybdate composite microspheres.

2. The method for preparing the hollow molybdate composite microspheres according to claim 1, wherein a ratio of a total mass of soluble $MCl_2$ to a mass of molybdic acid in the step (1) is 1:1.

3. The method for preparing the hollow molybdate composite microspheres according to claim 2, wherein in the step (2), a stirring time is 0.5-1 hour.

4. The method for preparing the hollow molybdate composite microspheres according to claim 3, wherein in the step (3), a temperature in the vacuum oven is 40-60° C.

5. The method for preparing the hollow molybdate composite microspheres according to claim 1, wherein in the step (2), a stirring time is 0.5-1 hour.

6. The method for preparing the hollow molybdate composite microspheres according to claim 5, wherein in the step (3), a temperature in the vacuum oven is 40-60° C.

7. The method for preparing the hollow molybdate composite microspheres according to claim 1, wherein in the step (3), a temperature in the vacuum oven is 40-60° C.

8. A method for catalyzing ammonia borane hydrolysis to produce hydrogen, wherein a catalyst used in the method is the hollow molybdate composite microspheres prepared by the method of claim 1.

9. A method for catalyzing ammonia borane hydrolysis to produce hydrogen, wherein a catalyst used in the method is the hollow molybdate composite microspheres prepared by the method of claim 2.

* * * * *